United States Patent
Alcorn et al.

(10) Patent No.: US 11,614,198 B2
(45) Date of Patent: Mar. 28, 2023

(54) DISPLAY AND AUDIO SYSTEMS AND METHODS FOR CONTROLLING POSITIONING OF DISPLAYS AND SPEAKERS BASED ON VIEWER AND LISTENER ATTENTION

(71) Applicant: Lenovo Enterprise Solutions (Singapore) Pte. Ltd., New Tech Park (SG)

(72) Inventors: Matthew Robert Alcorn, Research Triangle Park, NC (US); Youssef Jouad, Research Triangle Park, NC (US); James Gordon McLean, Research Triangle Park, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 571 days.

(21) Appl. No.: 16/714,661

(22) Filed: Dec. 13, 2019

(65) Prior Publication Data
US 2021/0180740 A1      Jun. 17, 2021

(51) Int. Cl.
*F16M 11/12* (2006.01)
*F16M 13/02* (2006.01)
(Continued)

(52) U.S. Cl.
CPC ........... *F16M 11/12* (2013.01); *F16M 11/045* (2013.01); *F16M 11/046* (2013.01); *F16M 13/02* (2013.01); *G02B 27/0179* (2013.01); *G05D 3/125* (2013.01); *G06F 3/013* (2013.01); *G06V 40/20* (2022.01); *F16M 2200/066* (2013.01); *G02B 2027/0187* (2013.01)

(58) Field of Classification Search
CPC .... F16M 11/12; F16M 11/045; F16M 11/046; F16M 13/02; F16M 2200/066; F16M 11/06; F16M 11/14; F16M 11/2021; F16M 11/10; F16M 11/18; H04N 5/655; H04N 5/64; G06K 9/3216; G06K 9/00228; G06K 9/00288; G06T 7/73; G02B 27/0179; G05D 3/125; G06F 3/013; G06F 3/012; G06F 3/165; G06F 3/011; G06V 40/20; G06V 40/18
USPC .............................................. 248/917, 181.1
See application file for complete search history.

(56) References Cited

U.S. PATENT DOCUMENTS

| | | |
|---|---|---|
| 7,854,415 B2 | 12/2010 | Holbrook et al. |
| 9,737,209 B2 | 8/2017 | Gramatikov et al. |

(Continued)

*Primary Examiner* — Muhammad Ijaz
(74) *Attorney, Agent, or Firm* — Olive Law Group, PLLC

(57) ABSTRACT

Display and audio systems and methods for controlling positioning of displays and speakers based on viewer and listener attention are disclosed. According to an aspect, a display system includes a selectively adjust a viewing angle of a display for one or more viewers. The display system also includes a motorized mechanism that controllably positions the display in one of the positions. An attention detection system is configured to acquire movement and position data of the viewer(s). The attention detection system is also configured to determine whether attention of the viewer(s) is directed to the display based on the acquired data. Further, the attention detection system is configured to control the support assembly to adjust the viewing angle of the display for viewing by the viewer(s) in response to determining that the attention of the viewer(s) is directed to the display.

20 Claims, 8 Drawing Sheets

(51) Int. Cl.

| | |
|---|---|
| *F16M 11/04* | (2006.01) |
| *G06F 3/01* | (2006.01) |
| *G05D 3/12* | (2006.01) |
| *G02B 27/01* | (2006.01) |
| *G06V 40/20* | (2022.01) |

(56) References Cited

U.S. PATENT DOCUMENTS

| | | | |
|---|---|---|---|
| 2002/0194791 A1 | 12/2002 | Baloga et al. | |
| 2010/0295782 A1* | 11/2010 | Binder | H04N 21/4223 |
| | | | 348/222.1 |
| 2012/0229300 A1* | 9/2012 | Fu | B60R 11/02 |
| | | | 340/901 |
| 2018/0052515 A1 | 2/2018 | Wanner et al. | |
| 2019/0072229 A1* | 3/2019 | Sherman | F16M 11/2028 |
| 2019/0093817 A1* | 3/2019 | Chu | F16M 11/14 |
| 2019/0107244 A1* | 4/2019 | Lee | F16M 11/10 |
| 2019/0373231 A1* | 12/2019 | Wu | H04N 9/3194 |

* cited by examiner

DISPLAY AND AUDIO SYSTEMS AND METHODS FOR CONTROLLING POSITIONING OF DISPLAYS AND SPEAKERS BASED ON VIEWER AND LISTENER ATTENTION

TECHNICAL FIELD

The presently disclosed subject matter relates generally to displays. Particularly, the presently disclosed subject matter relates to display and audio systems and methods for controlling positioning of displays and speakers based on viewer and listener attention.

BACKGROUND

Displays are typically used along with electronic equipment such as computing devices and video receivers. Video and sometimes audio signals may be input into a display, and the display may in turn present video and/or audio carried by the signals to a user. For example, the display has a screen for presenting visual information or data to a viewer. The display may also include speakers that convert a received audio signal to sound for presentation to a viewer of the display.

Displays are typically positioned such that its display screen faces a location or position where it is expected that at viewer will be located while viewing the display. In an office setting for example, a display stand or other display support assembly may support the display on a desk such that a person sitting at the desk can view the display screen. In this example, it can be expected that the person is at a fixed position with respect to the display and that further adjustments to the display's position are not needed after it is initially positioned. In other scenarios, a viewer may not be expected to stay in a fixed position such that the display may need to be re-positioned as the viewer moves. Also, in other scenarios, there may be multiple viewers of the display, and the display may need to be re-positioned depending on which viewers are currently viewing the display. As an example, a display in restaurant or a residence's living room may have one or more viewers that move about the room such that they are not located in desirable position for viewing the display.

In view of the foregoing, there is a need for improved systems and techniques for supporting and positioning displays with respect to viewers.

BRIEF DESCRIPTION OF THE DRAWINGS

Figure 1:
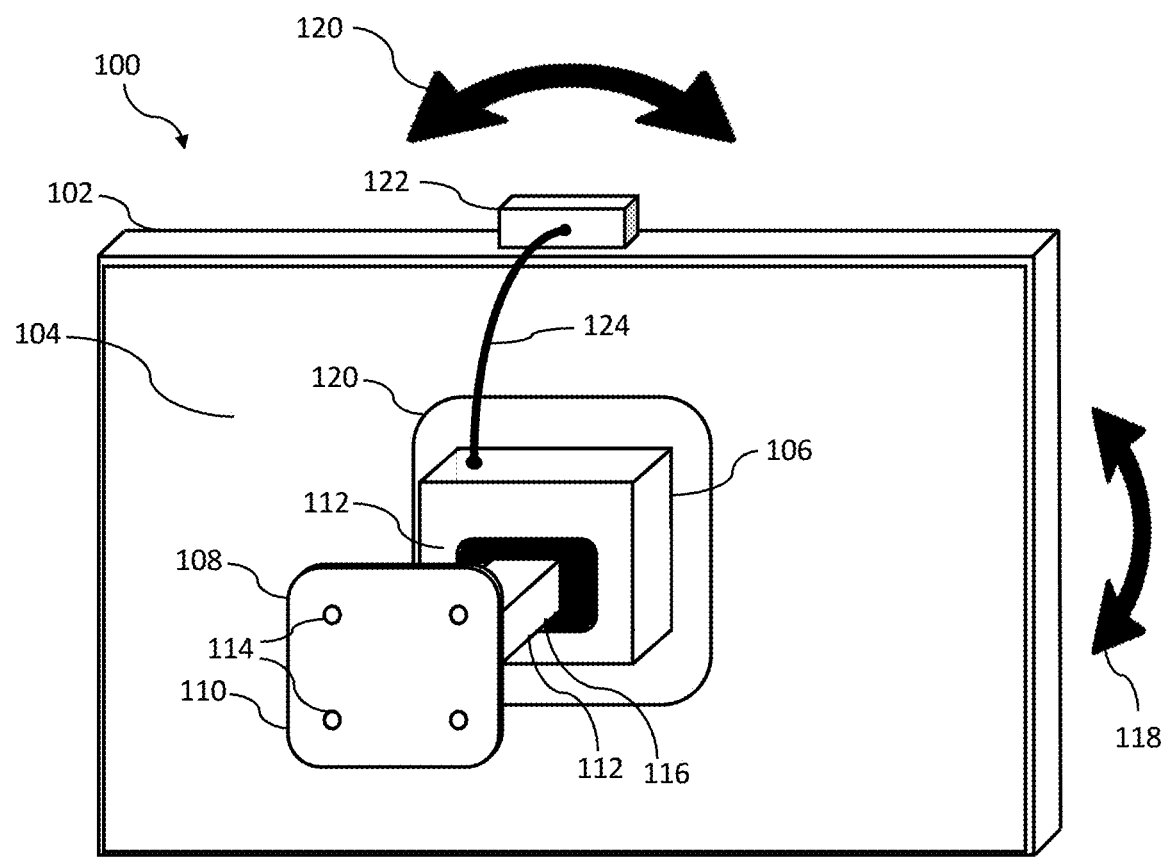
Figure 2:
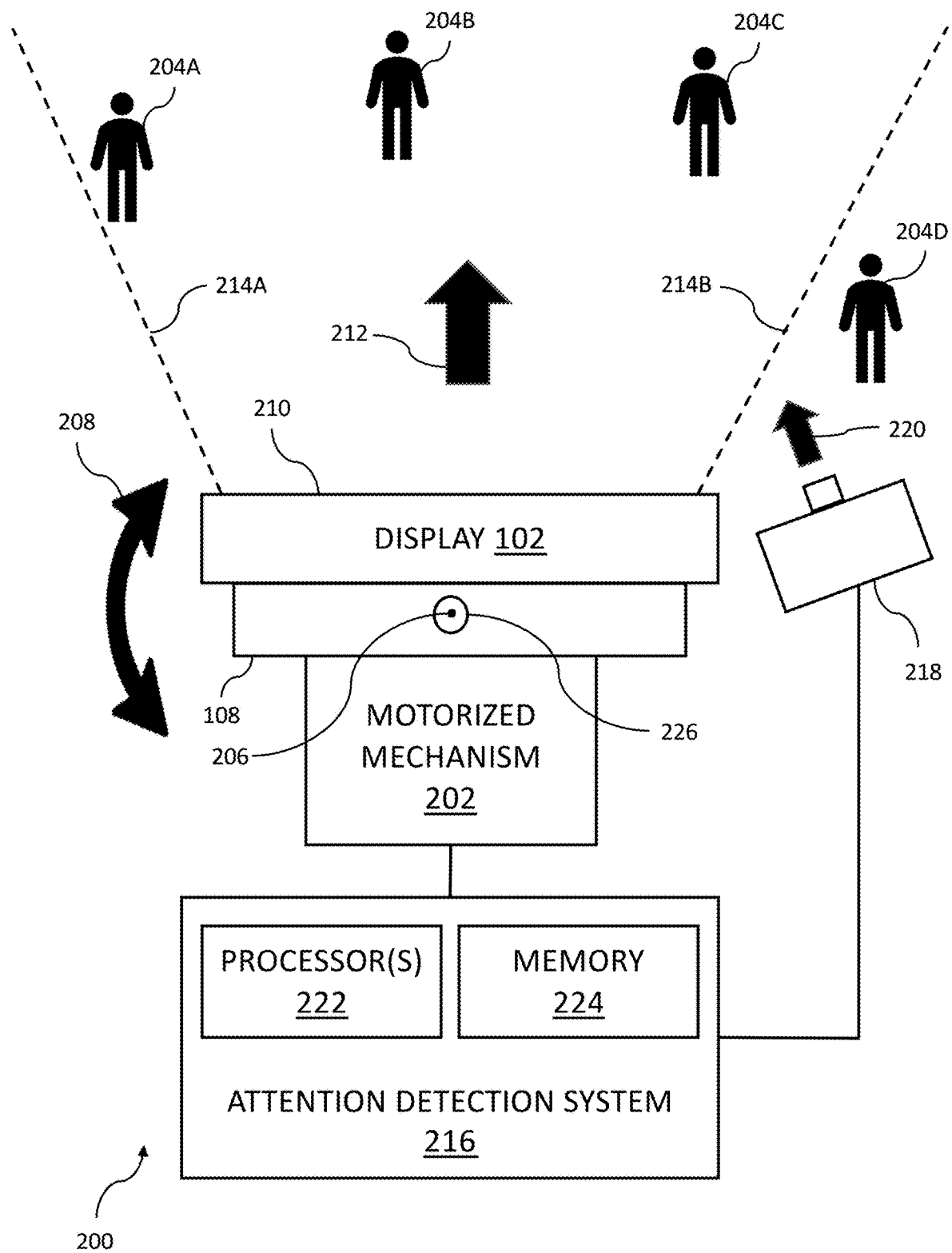
Figure 3:
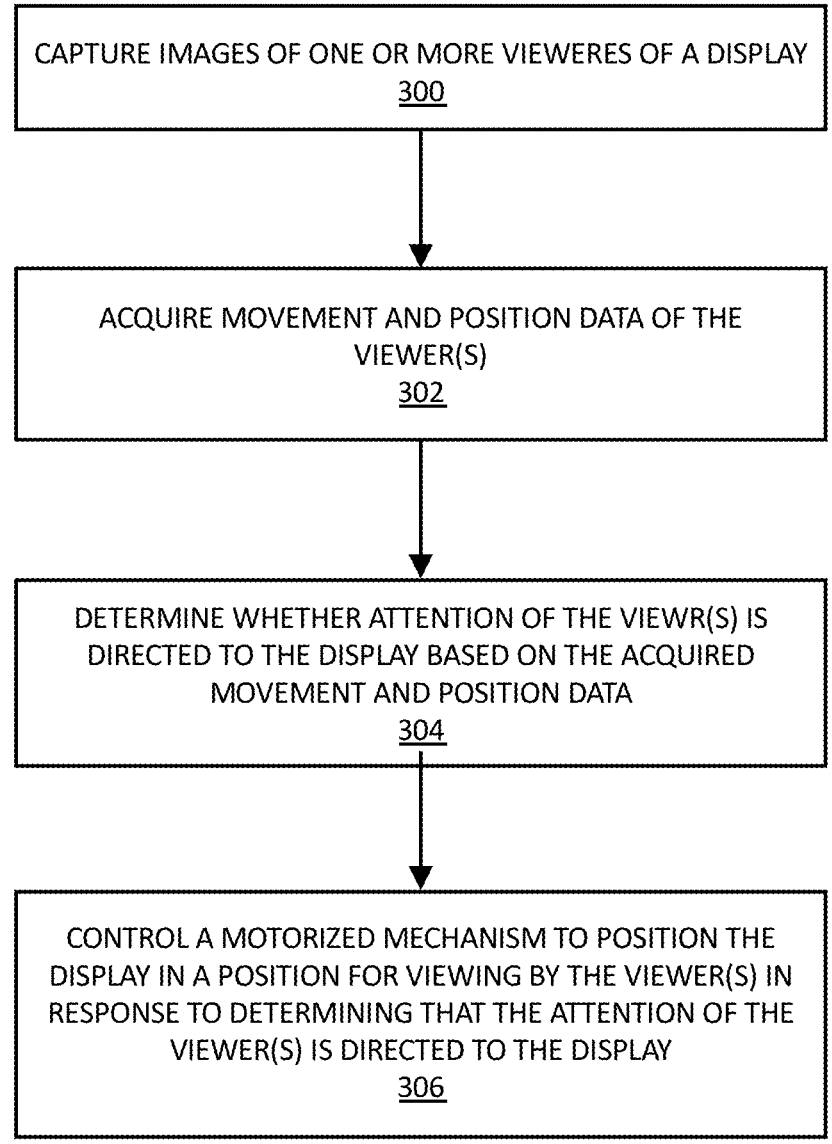
Figure 4:
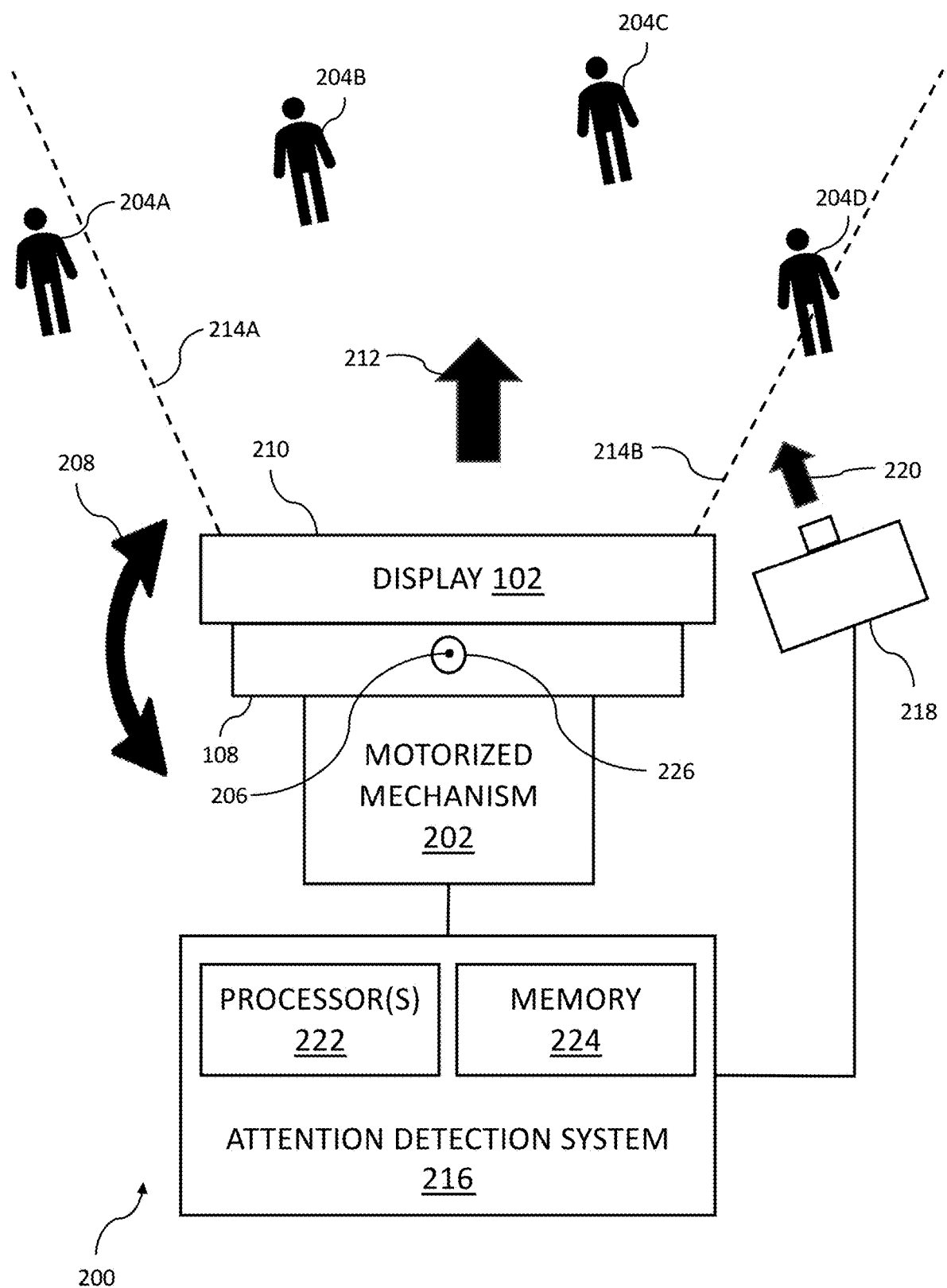
Figure 5:
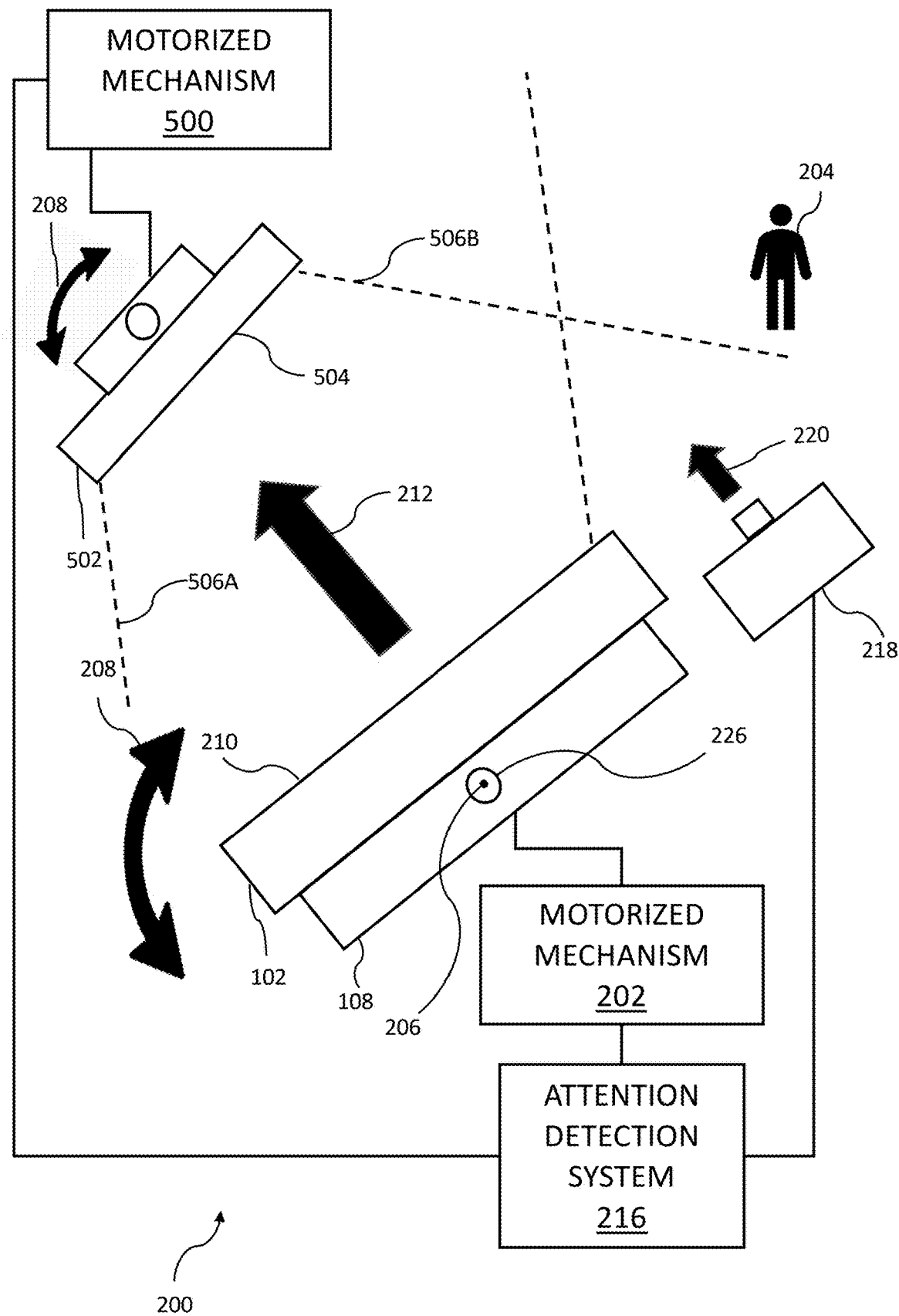
Figure 6:
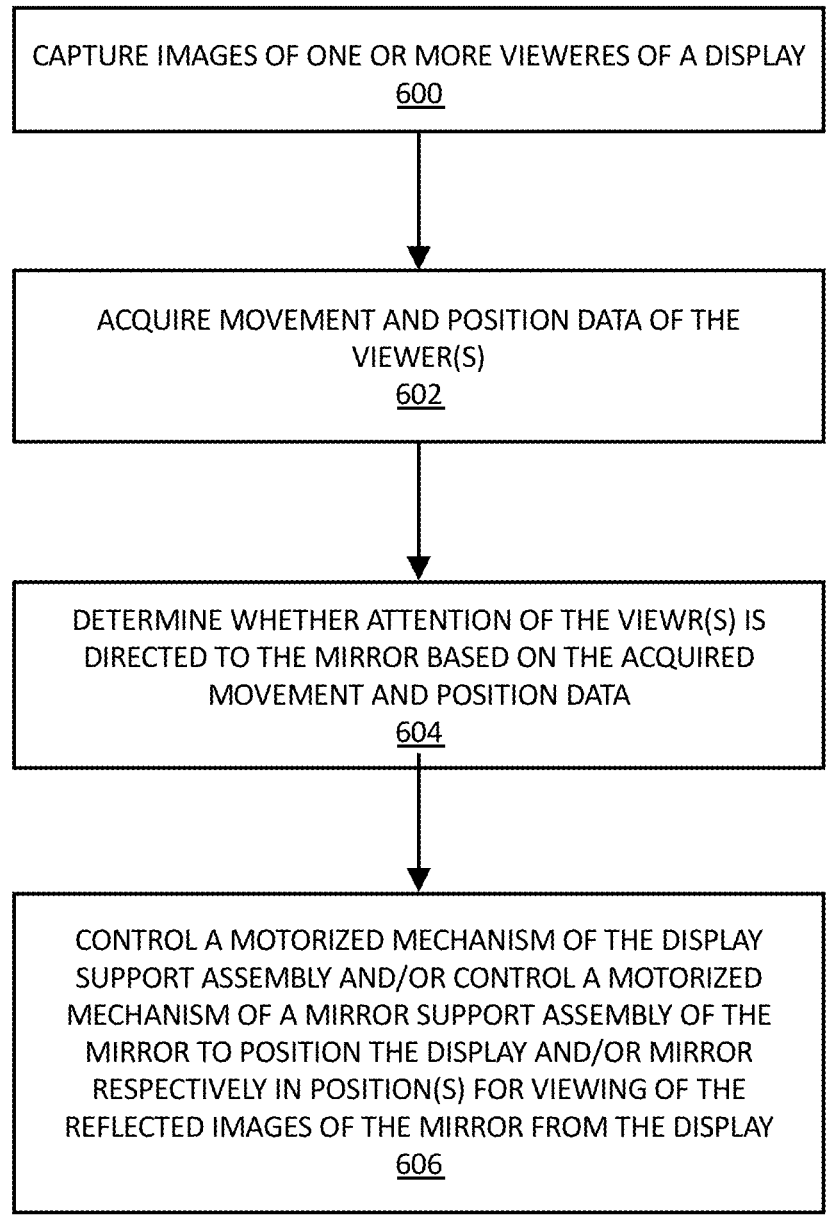
Figure 7:
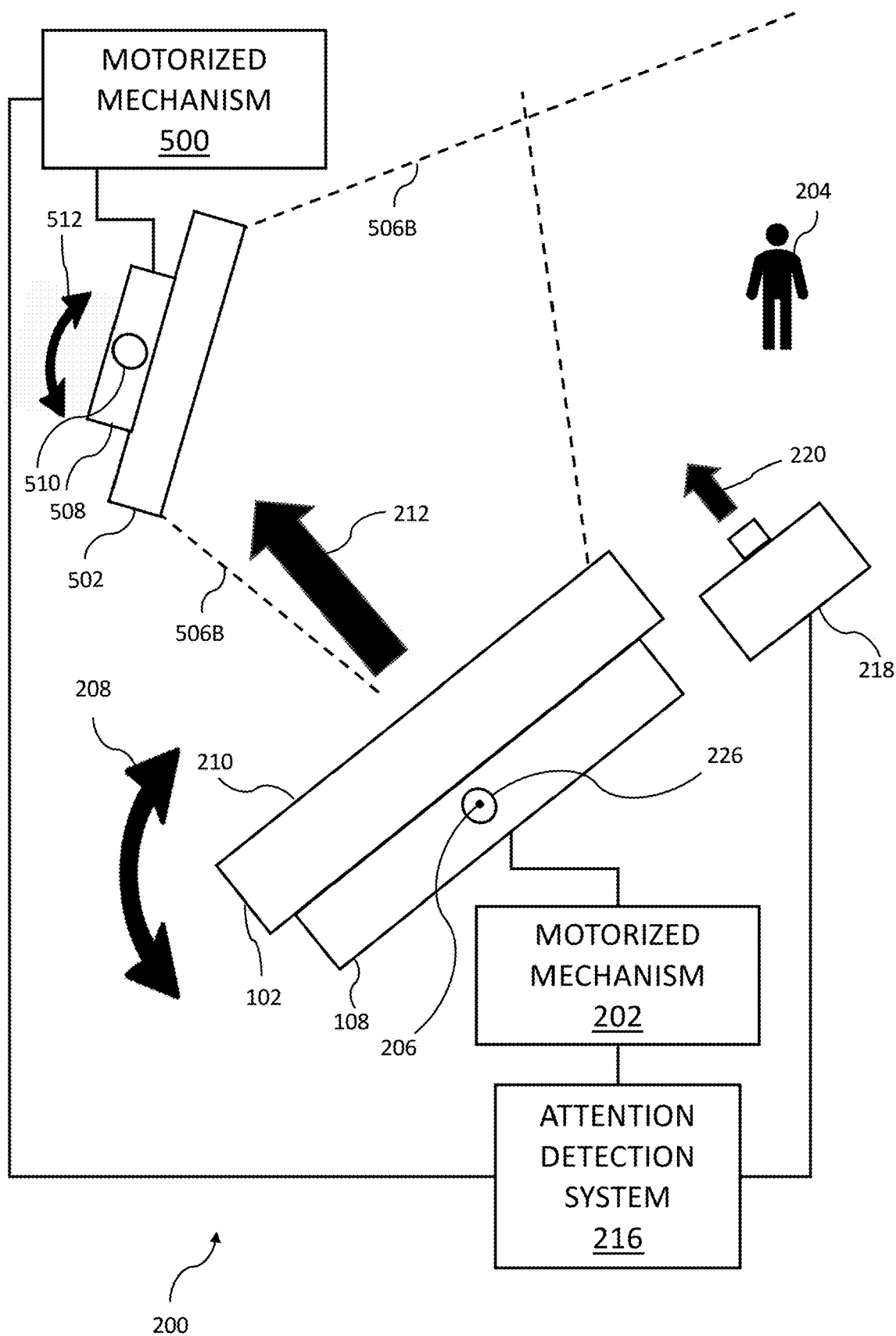
Figure 8:
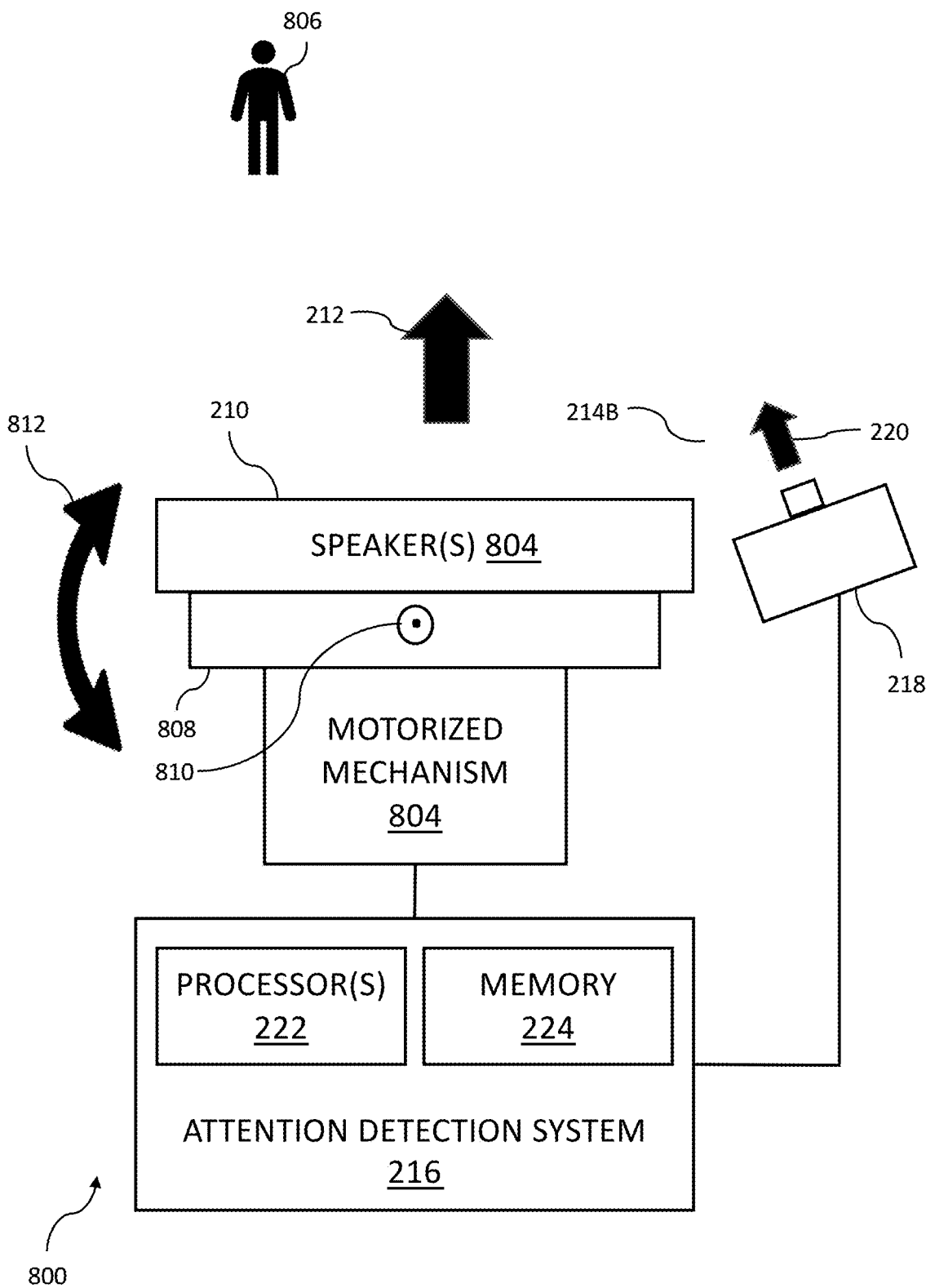

Having thus described the presently disclosed subject matter in general terms, reference will now be made to the accompanying Drawings, which are not necessarily drawn to scale, and wherein:

FIG. 1 is a perspective view of an example display system that can control a motorized mechanism to move a display among different positions for viewing by viewers in accordance with embodiments of the present disclosure;

FIG. 2 is a top view diagram of another example display system that can control a motorized mechanism to move a display among different positions for viewing by viewers in accordance with embodiments of the present disclosure;

FIG. 3 is a flow diagram of an example method for controlling the position of a display based on viewer attention in accordance with embodiments of the present disclosure;

FIG. 4 is a top view diagram of the display system in a position such that viewers, with their attentions directed to the display, are all positioned within the viewing angle of the display in accordance with embodiments of the present disclosure;

FIG. 5 is a top view diagram of another example display system that can control a motorized mechanism for moving a display and a motorized mechanism for moving a mirror in positions for viewing of a display by a viewer in accordance with embodiments of the present disclosure;

FIG. 6 is a flow diagram of an example method for controlling the position of a display and/or mirror based on viewer attention in accordance with embodiments of the present disclosure;

FIG. 7 is a top view diagram of the display system shown in FIG. 5 such that the mirror is moved for viewing of the display in the mirror; and FIG. 8 is a top view diagram of an example audio system that can control a motorized mechanism to move one or more speakers among different positions for listening by a listener in accordance with embodiments of the present disclosure.

SUMMARY

The presently disclosed subject matter relates to display and audio systems and methods for controlling positioning of displays and speakers based on viewer and listener attention. According to an aspect, a display system includes a display support assembly configured to selectively adjust a viewing angle of a display for one or more viewers. Further, the display system includes an attention detection system configured to acquire movement and position data of the viewer(s). The attention detection system is also configured to determine whether attention of the viewer(s) is directed to the display based on the acquired movement and position data. Further, the attention detection system is configured to control the support assembly to adjust the viewing angle of the display for viewing by the viewer(s) in response to determining that the attention of the viewer(s) is directed to the display.

According to another aspect, a display system includes a mirror. The display system also includes a motorized mechanism that controllably positions the mirror in one of a plurality of different positions. Further, the display system includes an attention detection system configured to determine whether attention of the viewer(s) is directed to the mirror based on the acquired movement and position data. The attention detection system is also configured to control the motorized mechanism to position the mirror in a position such that images generated by a display are reflected by the mirror for viewing of the reflected images in response to determining that the attention of the viewer(s) is directed to the mirror.

According to another aspect, an audio system includes a speaker support assembly configured to selectively position a speaker for listening by one or more listeners. Further, the audio system also includes an attention detection system configured to acquire movement and position data of the listener(s). Further, attention detection system is configured to determine whether attention of the listener(s) is directed to the speaker based on the acquired movement and position data. The attention detection system is also configured to control the speaker support assembly to position the speaker in a position for listening by the one or more listeners in response to determining that the attention of the one or more listeners is directed to the speaker.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

As referred to herein, a display is generally a device that displays visual information or visual data to a viewer. Example displays include, but are not limited to, televisions, flat screen displays, displays of personal computers, display screens of tablet computers, stand-alone displays, monitors, and the like. Multiple displays can cooperate together to present coordinated visual data to one or more viewers, and to present the coordinated visual data according to positions of displays with respect to one another. Visual data may include any information displayable on a display device. Visual data includes, but is not limited to, text, drawings, photographs, three-dimensional (3D) computer models, moving pictures, charts, tracings, animation, maps, and the like.

As referred to herein, a display support assembly is generally a device that can hold and/or support a display. A display support assembly may be attachable and detachable from a display. A display support assembly may fixedly attached to and/or integrated with a display. In examples, a display support assembly may include one or more mechanisms for selectively positioning the display in different positions for viewing by one or more viewers. The display positioning mechanism(s) may be operable to move the display as follows for holding, for example: vertical direction, horizontal direction, pivot vertically, and pivot horizontally. Such mechanisms may include components such as arms, springs, bolts, hydraulic systems, and the like for enabling a person to move the held display to a desired viewing position. Example display support systems include, but are not limited to, desk display stands, floor display stands, and wall-mount display assemblies.

FIG. 1 illustrates a perspective view of an example display system, generally designated 100, that can control a motorized mechanism to move a display 102 among different positions for viewing by viewers in accordance with embodiments of the present disclosure. Referring to FIG. 1, this figure depicts a rear side 104 of the display 102 where it is attached to a housing and support unit 106 and a display support assembly 108. The motorized mechanism may be contained within and integrated with the housing and support unit 106. Further, the unit 106 may contain an attention detection system, which is described in further detail herein. In accordance with embodiments, the attention detection system is configured to acquire movement and position data of one or more viewers, determine whether attention of the viewer(s) is directed to the display 102 based on the acquired movement and position data, and control the motorized mechanism to position the display in a position for viewing by the viewer(s) in response to determining that the attention of the viewer(s) is directed to the display 102.

With continuing reference to FIG. 1, the motorized mechanism contained within and integrated with the unit 106 may be suitably attached to the display support assembly 108. The display support assembly 108 may include a mounting plate 110 and an arm 112 for mounting or attaching the display 102 to a rigid structure, such as a wall (not shown). The mounting plate 110 may define multiple apertures 114 that extend therethrough for receiving screws to attach the plate 110 to the rigid structure. The arm 112 is rigidly attached to the mounting plate 110 at one end (not shown), and the arm 110 has an opposing end 116 that may be movably attached to the motorized mechanism of the unit 106. The motorized mechanism may be configured to pivot with respect to the opposing end 116 such that the display 102 moves in different directions. The display 102 may be moved to a predetermined position in this manner such that a display screen on its front side faces a desired direction toward one or more viewers in accordance with embodiments of the present disclosure.

In the example of FIG. 1, the motorized mechanism may include a pivot mechanism that is attached to the display 102 and configured to pivot the display 102 with respect to the arm 112. For example, the pivot mechanism may be controlled to pivot the display 102 in a vertical direction indicated by double arrow 118. Further, for example, the pivot mechanism may be controlled to pivot the display 102 in a horizontal direction indicated by double arrow 120. The attention detection system may control the pivot mechanism to pivot the display 102 based on acquired movement and position data of one or more viewers.

The system 100 may include an image capture device 122 configured to capture images and/or video of viewers or potential viewers of the display 102. The attention detection system may receive the captured images and/or video or the associated image data. In this way, the attention detection system can acquire or determine movement and position data of viewers within a field of view (FOV) of the image capture device 122. The image capture device 122 is positioned, in this example, on top of the display 102 and its FOV is generally directed in the same direction that the display screen of the display 102 faces. The attention detection system may determine whether attention of the viewer(s) in the captured images and/or video is directed to the display 102 based on the acquired movement and position data. For example, the attention detection system may determine whether the gaze of each viewer(s) is directed towards the display 102, thus deducing whether the viewer's attention is directed to the display 102. Subsequently, the attention detection system may control the motorized mechanism to move the display 102 to a position such that the display's 102 screen faces or substantially faces the viewer(s) who direct their attention towards the display (e.g., viewer(s) gazing at or towards the display 102).

In this example, the image capture device 122 is communicatively connected to the attention detection system via an electrical cord 124. The acquired image and/or video data may be communicated to the attention detection system via the electrical cord 124. Alternatively, the image capture device 122 and the attention detection system may communicate via a wireless communication system.

The motorized mechanism for controllably positioning the display (e.g., display 102) may include any suitable mechanical and electrical components for implementing the functionality described herein. For example, the motorized mechanism may include one or more gears, one or more arms, an electric motor, and/or the like configured to implement functionality described herein. The electric motor may be powered by a battery or other suitable power source. It is noted that although the motorized mechanism of the example of FIG. 1 is described as pivoting the display 102, alternatively a motorized mechanism may suitably move the display to a desired position such as directly or substantially directly in a vertical direction and/or horizontal direction to move the display in a desired position based on a determined attention of one or more viewers.

FIG. 2 illustrates a top view diagram of another example display system, generally designated 200, that can control a motorized mechanism 202 to move a display 102 among different positions for viewing by viewers 204A 204D in accordance with embodiments of the present disclosure. Referring to FIG. 2, the motorized mechanism 202 is operably attached to the display 102 and a display support assembly 108. The display support assembly 108 supports the display 102 and can selectively position the display 102 among several different positions for viewing by viewers 204A 204D. In this example, the display support assembly 108 may be rotated about a pivot point 206, which extends substantially in a vertical direction. Double arrow 208 generally indicates directions of pivot about the pivot point 206. The motorized mechanism 202 is operably connected to the display support assembly 108 for controllably rotating the display support assembly 108 and thereby the display 102 about the pivot point 206. It is noted that although the display 102 is described as being movable about the pivot point 206, it should be understood that the motorized mechanism 202 and the display support assembly 108 may also suitably move the display in other directions such that the display 102 is placed in other positions for viewing.

With continuing reference to FIG. 2, the display's 102 display screen 210 faces in a direction generally indicated by arrow 212. In FIG. 2, the display 102 is positioned such that viewers 204A 204C are within a viewing angle (depicted as an area generally between broken lines 214A and 214B) of the display 102. In this position of the display 102, viewer 204D is outside of the viewing angle of the display 102. The viewing angle refers to a maximum angle at which a display can be viewed with acceptable visual performance to its viewer. Although the viewing angle is depicted as only two lines 214A and 214B for simplicity of illustration, the viewing angle is cone-shaped and extends from the display screen 210 outward in multiple directions.

In accordance with embodiments, the system 200 includes an attention detection system 216 and an image capture device 218. The image capture device 218 is operable to capture or acquire one or more images or video in a direction generally indicated by arrow 220. The image capture device 218 is positioned such that its field-of-view (FOV) includes all viewers 204A 204D. Thus, the image capture device 218 can capture image(s) and/or video of all viewers 204A 204D in this position. The image capture device 218 can include its own power supply or can be operatively connected to the attention detection system 216 for receiving power supply. Further, the image capture device 218 is communicatively connected to the attention detection system 216 for communication of the acquired image and/or video data to the attention detection system 216.

The attention detection system 216 can be any suitable computing device including hardware, software, firmware, or combinations thereof for implementing the functionality described herein. In this example, the attention detection system 216 includes one or more processors 222 and memory 224. Further, the attention detection system 216 can receive the acquired image data and/or video data from the image capture device 218 and store the received data in memory 224. Subsequently, the attention detection system 216 may determine whether attention of viewers 204A 204C is directed to the display 102 based on the acquired image data and/or video data. For example, the attention detection system 216 may determine a gaze direction of each viewer 204A 204C to determine whether each viewer 204A 204C is gazing at the display 102. The attention detection system 216 may also control the motorized mechanism 202 to position the display 102 in a position for viewing by one or more of the viewer(s) 204A 204C in response to determining that the attention of the viewer(s) is directed to the display 102. Particularly, the attention detection system 216 may control the motorized mechanism 202 to rotate the display 102 such that the viewer(s) with their attention directed to the display 102 are within the viewing angle (the boundaries of which are depicted by lines 214A and 214B) of the display 102. As a result, viewer(s) with attention directed to the display 102 may have an acceptable view of the display screen.

FIG. 3 illustrates a flow diagram of an example method for controlling the position of a display based on viewer attention in accordance with embodiments of the present disclosure. The method is described by example as being implemented by the system 200 shown in FIG. 2, but it should be understood that the method may be implemented by any other suitable system.

Referring to FIG. 3, the method includes capturing 300 images of one or more viewers of a display. It is noted that the viewers may be viewers currently viewing the display or viewers who may be viewing the display. In an example, the image capture device 218 may be controlled by the attention detection system 216 to capture images or video. The captured images or video may include images of some or all of the viewers 204A 204D. The captured image data and/or video data may be communicated to the attention detection system 216 and stored in memory 224.

The method of FIG. 3 includes acquiring 302 movement and position data of the viewer(s). Continuing the aforementioned example, the attention detection system 216 may receive the image and/or video data, which includes movement and position data of viewers 204A 204D. For example, the attention detection system 216 may determine the movement and positions of the viewers 204A 204D based on the received image and/or video data.

The method of FIG. 3 includes determining 304 whether attention of the viewer(s) is directed to the display based on the acquired movement and position data. Continuing the aforementioned example, the attention detection system 216 may determine gaze direction of the viewers 204A 204D based on the acquired images. The attention detection system 216 may also determine whether the viewers 204A 204D are gazing at the display based on the determined gaze direction. In an example, the attention detection system 216 may be aware of the position and orientation of the display screen of the display 102 in relation to the position and orientation of the image capture device 218. In this example, the attention detection system 216 may apply a suitable gaze tracking technique for determining whether the viewers 204A 204D are gazing at the display 102 based on the gaze direction and the positions and orientation information of the display screen and the image capture device 218.

In accordance with embodiments for gaze tracking and determining gaze direction, the attention detection system 216 may use the acquired image data to localize the eye position of viewers 204A 204D in the image and track eye movement over time to determine the direction of gaze. In some examples, gaze tracking may be based on corneal reflection. In these examples, the angular difference between pupil position and the reflection of the light beam from the cornea surface may be used to determine the direction of gaze. In some techniques, near-infrared light may be directed to the eyes and the light reflected used for determining gaze direction. The light reflected from the eye may have two major components. One component is a "glint," which is a very small and very bright virtual image of the light source reflected from the front surface of the corneal bulge of the eye. The second component is light that has entered the eye and has been reflected back out from the retina. This light serves to illuminate the pupil of the eye from behind, causing the pupil to appear as a bright disk against a darker background. An eye gaze tracking system determines the center of the pupil and the glint and the change in the distance and direction between the two as the eye is rotated. The orientation of the eyeball can be inferred from the differential motion of the pupil center relative to the glint. The image capture device 218 may include a video camera sensitive to near-infrared light, a near-infrared light source (e.g., a light emitting diode (LED)), mounted to shine along the optical axis of the camera, and a computer system for analyzing images captured by the camera. The on-axis light source may be positioned at or near the focal center of the camera. Image processing techniques such as intensity threshold and edge detection may be used to identify the glint and the pupil from the image captured by the camera using on-axis light, and to locate the pupil center in the camera's FOV.

The method of FIG. 3 includes controlling 306 a motorized mechanism to position the display in a position for viewing by the viewer(s) in response to determining that the attention of the viewer(s) is directed to the display. Continuing the aforementioned example, the attention detection system 216 may control the motorized mechanism 202 to position the display in a position for viewing by the viewer(s) 204A 204D based on the attention of one or more of the viewers 204A 204D is giving to the display 102. For example, the attention detection system 216 may analyze the image data and/or video data received from the image capture device 218 to determine who among the viewers 204A 204D have their attention directed towards the display 102. The attention detection system 216 may control the motorized mechanism 202 to turn the display 102 such that its screen faces the viewers having their attention directed towards the display 102.

As an example of controlling the motorized mechanism, the attention detection system 216 may recognize viewers 204A 204D based on acquired image and/or video data and analyze their posture and/or gaze direction to determine whether each viewer's 204A 204D attention is directed to the display 102. In the example of FIG. 2, the attention detection system 216 may determine that only viewers 204B 204D have their gazes directed towards the display 102. In this instance of the position of the display 102 shown in FIG. 2, the attention detection system 216 may determine that viewers 204A-204C are within the viewing angle of the display 102; however, viewer 204D is outside of the viewing angle. Based on this determined, the attention detection system 216 may determine that the display 102 should be rotated clockwise such that all of viewers 204B 204C are within the viewing angle. The attention detection system 216 may control the motorized mechanism 202 to move the display into this position. FIG. 4 illustrates a top view diagram of the display system 200 in a position such that viewers 204B 204D, with their attentions directed to the display 102, are all positioned within the viewing angle of the display 102 in accordance with embodiments of the present disclosure. It is noted that in FIG. 3 the viewer 204A is outside of the viewing angle of the display 102; however, this is acceptable because the attention display system 216 determined that the attention of the viewer 204A was not directed towards the display 102.

A motorized mechanism in accordance with embodiments of the present disclosure may be any suitable motorized mechanism for controllably moving a display or other object between two or more positions and/or orientations. As an example, a motorized mechanism may include one or more mechanical components, such as an arm, bolts, pistons, hydraulics, servos, and other components suitably connected together for implementing the structures and functionality described herein. The motorized mechanism may include one or more electrical motors for moving the components of the motorized mechanism under control by electrical signaling by a control device, such as the attention detection system. As an example in FIG. 4, the motorized mechanism 202 may controllably move a pivot mechanism 226 of the display assembly 108 such that the display 102 pivots in the horizontal direction depicted by arrow 208. In another example, the motorized mechanism may controllably move a pivot mechanism of the display assembly such that the display 102 pivots in the vertical direction as depicted by arrow 118 in FIG. 1. In yet another example, the motorized mechanism may controllably move a mechanism of the display assembly (e.g., a hydraulic assembly) such that the display moves directly or substantially in a vertical and/or horizontal direction.

In accordance with embodiments, the attention detection system may continuously adjust the display based on the attentions of viewers. Particularly, for example, the attention detection system may continuously or at least periodically acquire image and/or video data of viewers, determine whether attention of the viewers is directed to the display based on the data, and control a motorized mechanism to position the display in a position for viewing by the viewers based on whether their attention is directed to the display. For example, the steps of the method of FIG. 3 may be implemented in a loop for maintaining adjustment of the display's position based on viewer's attention to the display. Further, for example, viewers may enter and exit an FOV of the image capture device and their attention direction may change. As viewers enter and exit and their attention direction changes, the attention detection system may controllably move the display such that its position is optimized for best or at least adequate viewing by viewers giving attention to the display (e.g., gazing at the display).

FIG. 5 illustrates a top view diagram of another example display system 200 that can control a motorized mechanism 202 for moving a display and a motorized mechanism 500 for moving a mirror 502 in positions for viewing of a display 102 by a viewer 204 in accordance with embodiments of the present disclosure. Referring to FIG. 5, the attention detection system 216 may operably control motorized mechanism 202 and/or motorized mechanism 500 to move the display 102 and/or the mirror 502, respectively, to positions such that a viewer 204 may view images displayed by the display 102. The display 102 and/or mirror 502 may be moved to such positions in response to determining that the viewer 204 is directing his or her attention to the mirror 502. In such instance, it may be assumed that the viewer 204 is directing attention to the mirror 502 in order to see the image displayed by the display 102 and that is reflected by the mirror 502. In this example, attention detection system 216 may control both motorized mechanisms 202 and 500; however, it is noted that the motorized mechanisms may be separately controlled.

FIG. 6 illustrates a flow diagram of an example method for controlling the position of a display and/or mirror based on viewer attention in accordance with embodiments of the present disclosure. The method is described by example as being implemented by the system 200 shown in FIG. 5, but it should be understood that the method may be implemented by any other suitable system.

Referring to FIG. 6, the method includes capturing 600 images of one or more viewers of a display. In the example of FIG. 5, the image capture device 218 captures a video of the viewer 204 who is looking at the mirror 502. The captured video data may be communicated to the attention detection system 216 and stored in its memory.

The method of FIG. 6 includes acquiring 602 movement and position data of the viewer(s). Continuing the aforementioned example, the attention detection system 216 may receive the video data, which includes movement and position data of viewer 204. For example, the attention detection system 216 may determine the movement and positions of the viewer 204 based on the received video data.

The method of FIG. 6 includes determining 604 whether attention of the viewer(s) is directed to the mirror based on the acquired movement and position data. Continuing the aforementioned example, the attention detection system 216 may determine gaze direction of the viewer 204 based on the acquired video. The attention detection system 216 may also determine whether the viewer 204 is gazing at the mirror 502 based on the determined gaze direction. In an example, the attention detection system 216 may be aware of the position and orientation of a reflective surface 504 of the mirror 502 in relation to the position and orientation of the image capture device 218. In this example, the attention detection system 216 may apply a gaze tracking technique for determining whether the viewer 204 is gazing at the reflective surface 504 of the mirror 502 based on the gaze direction and the positions and orientation information of the reflective surface 504 and the image capture device 218.

The method of FIG. 3 includes controlling 306 a motorized mechanism to position the display in a position for viewing by the viewer(s) in response to determining that the attention of the viewer(s) is directed to the display. Continuing the aforementioned example, the attention detection system 216 may control the motorized mechanism 202 and/or the motorized mechanism 500 to position the display and/or the mirror in position(s) for viewing by the viewer 204 based on the attention that the viewer 204 is giving to the mirror 504. For example, the attention detection system 216 may analyze the video data received from the image capture device 218 to determine whether the viewer 204 is giving attention to the mirror 402. The attention detection system 216 may control the motorized mechanism 202 and/or 500 to turn the display 102 and/or the mirror 502, respectively, such that the images on the display 102 are reflected by the reflective surface 504 to be within a viewing angle (depicted as an area generally between broken line 506A and 506B) for viewing by the viewer 204. The attention detection 216 can recognize that the viewer 204 is not within the viewing angle of the mirror (between broken lines 506A and 506B) as shown in FIG. 5, therefore, the mirror 504 can be moved to the position shown in FIG. 7, which illustrates a top view diagram of the display system 200 shown in FIG. 5 such that the mirror 502 is moved for viewing of the display 102 in the mirror 502. Particularly, a mirror support assembly 508 can include a pivot mechanism 510 that can be controllably rotated to turn the mirror 502 to the position shown in FIG. 7. The display support assembly 508 and thereby the display 502 can be pivoted in directions indicated by double arrow 512.

FIG. 8 illustrates a top view diagram of an example audio system, generally designated 800, that can control a motorized mechanism 802 to move one or more speakers 804 among different positions for listening by a listener 806 in accordance with embodiments of the present disclosure. Referring to FIG. 8, a motorized mechanism 202 is operably attached to the speaker(s) 804 and a speaker support assembly 808 having a pivot mechanism 810 for rotation in directions indicated by double arrow 812. The speaker support assembly 808 supports the speaker(s) 804 and can selectively position the speaker(s) 804 among several different positions for listening by the listener 806. The motorized mechanism 804 is operably connected to the speaker support assembly 808 for controllably rotating the speaker support assembly 808 and thereby the speaker(s) 804. The attention detection system 216 is configured to acquire movement and position data of the listener 806. Further, the attention detection system 216 can determine whether attention of the listener 806 is directed to the speaker(s) 804 based on the acquired movement and position data. The attention detection system 216 can also control the motorized mechanism 804 to position the speaker(s) 804 in a position for listening by the listener 806 in response to determining that the attention of the listener 804 is directed to the speaker(s) 804.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A display system comprising:
   a support assembly configured to selectively adjust a viewing angle of a display for one or more viewers; and
   an attention detection system configured to:
      acquire position data of the one or more viewers;
      determine whether attention of the one or more viewers is directed to the display based on the acquired position data; and
      control the support assembly to adjust the viewing angle of the display for viewing by the one or more viewers in response to determining that the attention of the one or more viewers is directed to the display.

2. The display system of claim 1, wherein the support assembly includes a pivot mechanism configured to attach to the display and to pivot the display, when attached, in a vertical direction and/or a horizontal direction to adjust the viewing angle of the display.

3. The display system of claim 2, wherein the support assembly comprises a motorized mechanism configured to move the pivot mechanism to pivot the display, when attached, in the vertical direction and/or the horizontal direction.

4. The display system of claim 1, wherein the support assembly includes a mechanism configured to attach to the display and move the display, when attached, in a vertical direction and/or a horizontal direction to adjust the viewing angle of the display.

5. The display system of claim 4, wherein the support assembly comprises a motorized mechanism configured to move the display, when attached, in the vertical direction and/or the horizontal direction.

6. The display system of claim 1, wherein the support assembly includes at least one arm configured to attach the display to the display system.

7. The display system of claim 1, wherein the support assembly comprises a motorized mechanism comprising an electrical motor operably attached to the support assembly for adjusting the viewing angle of the display.

8. The display system of claim 1,
   wherein the attention detection system comprises an image capture device configured to acquire one or more images of the one or more viewers, and
   wherein the attention detection system is configured to determine the acquired position data of the one or more viewers based on the acquired one or more images.

9. The display system of claim 8, wherein the acquired one or more images include images of eyes of the one or more viewers, and
   wherein the attention detection system is configured to:
      determine gaze direction of the one or more viewers based on the acquired one or more images;
      determine whether the one or more viewers are gazing at the display based on the determined gaze direction; and
      control the support assembly to adjust the viewing angle of the display to face the one or more viewers in response to determining that the one or more viewers are gazing at the display.

10. The display system of claim 1,
    wherein the attention detection system comprises an image capture device configured to acquire one or more images of the one or more viewers, and
    wherein the attention detection system is configured to determine the acquired position data of the one or more viewers based on the acquired one or more images.

11. The display system of claim 10, wherein the attention detection system is configured to:
    determine a position of the one or more viewers based on the acquired one or more images; and
    control the support assembly to adjust the viewing angle of the display to face the determined position of the one or more viewers.

12. The display system of claim 1, further comprising:
    a mirror,
    wherein the support assembly comprises a motorized mechanism configured to controllably adjust a position of the mirror,
    wherein the attention detection system is configured to determine whether attention of the one or more viewers is directed to the mirror based on the acquired position data, and
    wherein controlling the support assembly to adjust the viewing angle of the display comprises controlling the motorized mechanism to position the mirror in a position such that images generated by the display are reflected by the mirror towards the one or more viewers for viewing of the reflected images in response to determining that the attention of the one or more viewers is directed to the mirror.

13. The display system of claim 1, further comprising:
    a mirror,
    wherein the support assembly comprises a motorized mechanism configured to controllably adjust a position of the mirror,
    wherein the attention detection system is configured to determine that one or more users are facing towards the mirror and away from the display based on the acquired position data, and wherein controlling the support assembly to adjust the viewing angle of the display comprises controlling the motorized mechanism to position the mirror in a position such that images generated by the display are reflected by the mirror towards the one or more viewers for viewing of the reflected images in response to determining that the attention of the one or more viewers is directed to the mirror.

14. The display system of claim 1,
wherein acquiring position data of the one or more viewers comprises acquiring position data of the one or more viewers whose attention is directed to the display and one or more bystanders whose attention is not directed to the display,
wherein the attention detection system is configured to distinguish the one or more viewers whose attention is directed to the display from the one or more bystanders whose attention is not directed to the display, and
wherein the adjusted viewing angle of the display is configured to direct images generated by the display to the one or more viewers whose attention is directed to the display.

15. The display system of claim 14, wherein the adjusted viewing angle is directed towards a center of positions of the one or more viewers whose attention is directed to the display.

16. The display system of claim 1, wherein the display system is configured to cooperate with another display system to present coordinated visual data to the one or more viewers, and to present the coordinated visual data according to positions of the display system and the another display system with respect to one another.

17. An audio system comprising:
a speaker support assembly configured to selectively position a speaker for listening by one or more listeners; and
an attention detection system configured to:
acquire position data of the one or more listeners;
determine whether attention of the one or more listeners is directed to the speaker based on the acquired position data; and
control the speaker support assembly to position the speaker in a position for listening by the one or more listeners in response to determining that the attention of the one or more listeners is directed to the speaker.

18. The audio system of claim 17, wherein the speaker support assembly comprises an electrical motor for controlling the positioning of the speaker.

19. The audio system of claim 17,
wherein the attention detection system comprises an image capture device configured to acquire one or more images of the one or more listeners, and
wherein the attention detection system is configured to determine the acquired position data of the one or more listeners based on the acquired one or more images.

20. The audio system of claim 19, wherein the acquired one or more images include images of eyes of the one or more viewers, and
wherein the attention detection system is configured to:
determine gaze direction of the one or more listeners based on the acquired one or more images;
determine whether the one or more listeners are gazing towards the speaker based on the determined gaze direction; and
control the speaker support assembly to position the speaker to face the one or more listeners in response to determining that the one or more listeners are gazing toward the speaker.

* * * * *